(12) United States Patent
Yoshihisa

(10) Patent No.: US 7,821,685 B2
(45) Date of Patent: Oct. 26, 2010

(54) IMAGE READING METHOD, IMAGE READING APPARATUS, AND STORAGE MEDIUM HAVING PROGRAM STORED THEREON

(75) Inventor: Yasuhiko Yoshihisa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 427 days.

(21) Appl. No.: 11/863,069

(22) Filed: Sep. 27, 2007

(65) Prior Publication Data

US 2008/0074716 A1    Mar. 27, 2008

(30) Foreign Application Priority Data

Sep. 27, 2006 (JP) ............................. 2006-262318
Sep. 14, 2007 (JP) ............................. 2007-238825

(51) Int. Cl.
*H04N 1/04* (2006.01)

(52) U.S. Cl. ........................ 358/497; 358/474; 358/486; 358/412; 358/406

(58) Field of Classification Search ................. 358/486, 358/497, 494, 474, 412, 406; 399/205, 208, 399/210, 211; 318/757, 760, 256–260, 685, 318/686
See application file for complete search history.

(56) References Cited

U.S. PATENT DOCUMENTS

| | | | |
|---|---|---|---|
| 4,917,460 A * | 4/1990 | Yamada et al. | 359/814 |
| 6,034,791 A * | 3/2000 | Tang et al. | 358/475 |
| 6,532,084 B1 * | 3/2003 | Chiu | 358/475 |

FOREIGN PATENT DOCUMENTS

JP    2005-237198 A    9/2005

* cited by examiner

*Primary Examiner*—Cheukfan Lee
(74) *Attorney, Agent, or Firm*—Sughrue Mion, PLLC

(57) ABSTRACT

An image reading method according to the present invention involves causing an image sensor for reading an image of a document to move from a side at which the document is placed toward a home position of the image sensor, causing to reverse a movement direction at a turn-back position after the image sensor has passed the home position, and causing the image sensor to move to the home position again.

9 Claims, 10 Drawing Sheets

IMAGE READING METHOD, IMAGE READING APPARATUS, AND STORAGE MEDIUM HAVING PROGRAM STORED THEREON

CROSS-REFERENCE TO RELATED APPLICATIONS

The present application claims priority upon Japanese Patent Application No. 2006-262318 filed on Sep. 27, 2006, and Japanese Patent Application No. 2007-238825 filed on Sep. 14, 2007, which are herein incorporated by reference.

BACKGROUND

1. Technical Field

The present invention relates to image reading methods, image reading apparatuses, and storage media having a program stored thereon.

2. Related Art

Conventionally, so-called scanner devices are known that are image reading apparatuses for reading an image of a document surface. In these scanner devices, a document is placed on a platen constituted by a transparent glass plate or the like, a one-dimensional image sensor arranged across the platen scans along the surface of the document, and an image of the document surface is read by the image sensor.

The image sensor moves in a reciprocating manner along the platen and carries out an image-reading scan while moving in a forward pass from a home position, which is a movement commencement position. After image reading is finished, the image sensor moves back in a return pass toward the home position without carrying out a reading scan, then stops at the home position and stands by ready for the next image-reading scan.

Before commencing image reading, the scanner device carries out shading correction in order to standardize the sensitivity of each pixel of the image sensor. In order to carry out this correction, a white reference board whose uniform white color surface is arranged facing toward the image sensor side is arranged between the home position and the image reading commencement position. The scanner device is configured such that, before commencing image reading, shading correction is carried out by scanning the white color surface of the white reference board with the image sensor.

The image sensor is attached to a carriage and the image sensor moves in a reciprocating manner due to the carriage moving in a reciprocating manner by obtaining a driving force from a DC motor, which is a drive source, through a power transmission system constituted by components such as a gear train, pulleys, and a timing belt.

In this regard, so-called backlash occurs in the power transmission system constituted by components such as a gear train, pulleys, and a timing belt; the backlash originating in such factors as loose engagement of engaging portions between gears and slack in the timing belt. Backlash does not become a problem while the power transmission system continues to drive in a same direction since the components in the power transmission system (gear-to-gear, or pulley-to-timing belt) are being driven in a state in which a pressing force is constantly applied from a side that provides the driving force to a side that receives the driving force.

However, when the driving direction changes, for example, after a driving side gear of gears that are engaged with each other turns idly by a backlash amount, this gear engages with a receiving side gear and the driving force is transmitted.

The driving side gear rotates at high speed while turning idly by the backlash amount because it rotates in a light load state. And rotation of the gear on the receiving side of the driving force is stopped until the backlash from the driving side gear is eliminated. For this reason, the driving side gear commences engagement in a state in which it collides against the gear on the receiving side of the driving force. Consequently, immediately after engagement with the drive source side gear has commenced, the gear on the receiving side of the driving force also moves undesirably at high speed during a moment until the impact of the collision is absorbed.

A state in which the image sensor is standing by at the home position involves the image sensor stopping in a state having returned to the home position via a return pass after completion of image reading. For this reason, backlash is present in the drive transmission system in a direction in which the image sensor is to move to the forward pass side.

That is, for example, in the gears engaging with each other, when the driving side gear has rotated in the direction in which the image sensor moves, backlash is present in the gear that receives the driving force of that gear.

For this reason, if the image sensor commences to move by the rotation of the DC motor in this state, when backlash is eliminated, for example, when the drive source side gear and the drive force receiving side gear commence engagement, an impact is produced and the image sensor moves undesirably for a moment at high speed.

As means for addressing this problem means is conceivable for suppressing occurrences of impact of when eliminating backlash by setting rotation of the DC motor to low speed until the backlash is eliminated (JP-A-2005-237198).

However, when using the means described in Patent Document 1, there is a problem that the time until the image sensor commences movement is delayed.

SUMMARY

Accordingly, it is an advantage of the present invention to commence movement of the image sensor from the home position in a state in which there is no impact due to backlash.

In order to achieve the above-described advantage, a primary aspect of the invention is directed to an image reading method, including:
causing an image sensor for reading an image of a document to move from a side at which the document is placed toward a home position of the image sensor;
causing to reverse a movement direction at a turn-back position after the image sensor has passed the home position; and
causing the image sensor to move to the home position again.

Other features of the invention will become clear through the accompanying drawings and the following description.

DESCRIPTION OF EXEMPLARY EMBODIMENTS

Figure 1:
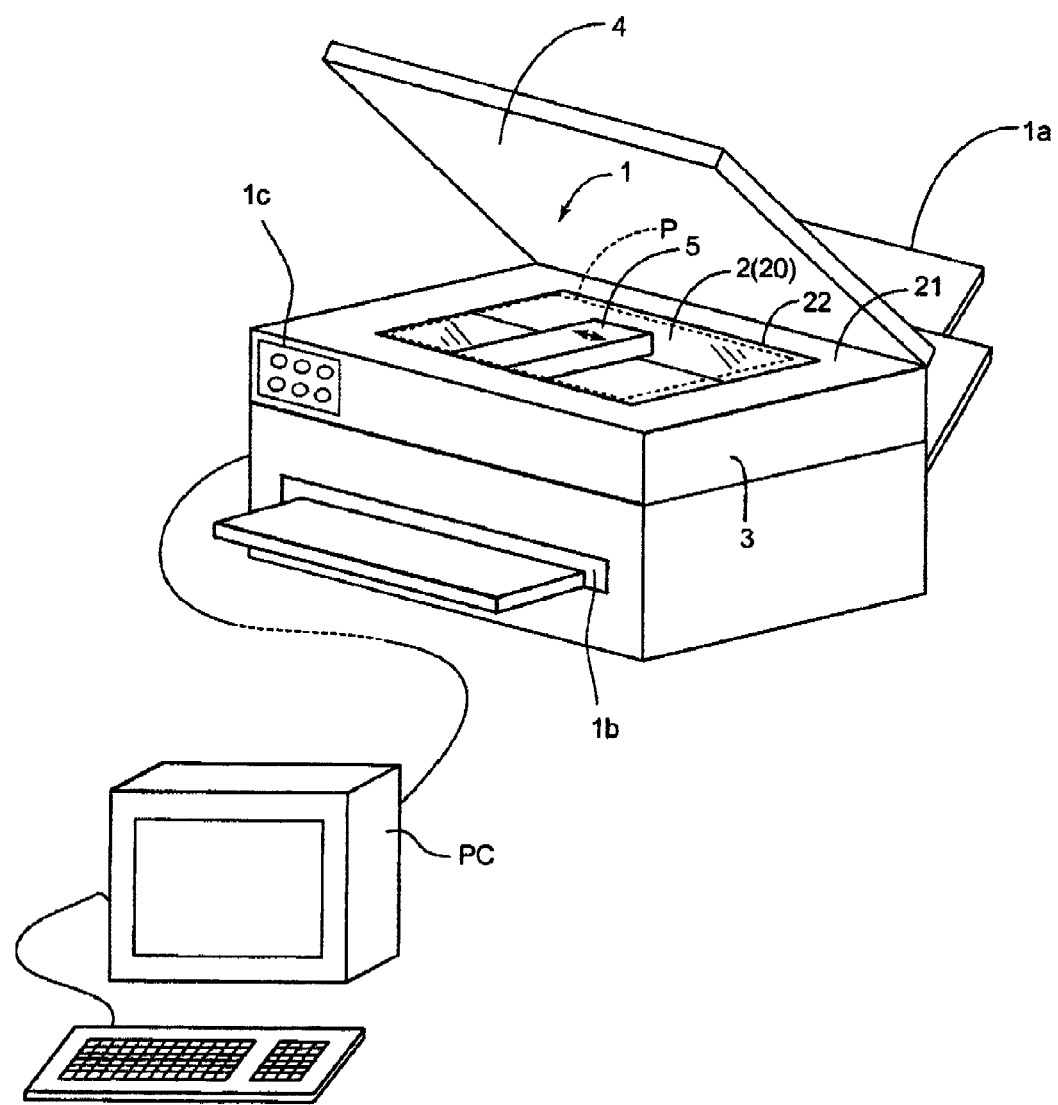
FIG. 1 is a perspective view showing an external view of a scanner device according to a first embodiment.

At least the following matters will be made clear by the description of the present specification and the accompanying drawings.

An image reading method, including:
  causing an image sensor for reading an image of a document to move from a side at which the document is placed toward a home position of the image sensor;
  causing to reverse a movement direction at a turn-back position after the image sensor has passed the home position; and
  causing the image sensor to move to the home position again.

When configured in this manner, backlash produced on a forward drive side of a movement mechanism is reduced at the turn-back position by having the image sensor return to the home position from the turn-back position. For this reason, the image sensor can be made to stand by at the home position in a state where there is no backlash in the movement mechanism.

In this image reading method, it is preferable that a position of a reference board for adjusting a reading sensitivity of the image sensor is set to a position at which, after backlash produced in the movement mechanism due to the movement direction being reversed is eliminated, the image sensor can be caused to move without receiving an influence of when the movement mechanism eliminated the backlash.

By doing this, when the reference board is to be read, the image sensor can be caused to move without receiving an influence of when backlash is eliminated, and therefore correction of the image sensor sensitivity can be performed by reading the reference board appropriately.

In this image reading method, it is preferable that the home position is a position at which the image sensor opposes the reference board.

By doing this, movement of the image sensor can be commenced without receiving an influence of when backlash is eliminated even when commencing movement from the home position at the time of commencing reading while carrying out reading of the reference board, thereby enabling appropriate reading of the reference board.

In this image reading method, the home position may be positioned between the reference board for adjusting the reading sensitivity of the image sensor and the turn-back position, and the position of the reference board may be set to a position at which, after backlash produced in a movement mechanism due to the movement direction being caused to reverse is eliminated, the image sensor can be caused to move without receiving an influence of when the movement mechanism eliminated the backlash.

By doing this, even assuming a case where the influence of when backlash is eliminated is undesirably received at the home position, the image sensor can be caused to move at a position where reading of the reference board is to be carried out without receiving the influence of when backlash is eliminated.

In this image reading method, it is preferable that a movement of the image sensor from the turn-back position to the home position is performed at a slower speed than a speed of when the image sensor is caused to move to a position for reading an image of the document after reading the reference board for adjusting the reading sensitivity of the image sensor.

When configured in this manner, the image sensor can be caused to move a very small movement distance by performing movement control using extremely low speed movement control for example, and therefore the distance between the turn-back position and the home position can be shortened.

In this image reading method it is preferable that two speeds of a first speed and a second speed faster than the first speed are used for movement of the image sensor from the turn-back position to the home position, the first speed being slower than a speed of when the image sensor is moved to the position for reading an image of the document after reading the reference board for adjusting the reading sensitivity of the image sensor, that the image sensor is caused to move so as to achieve the second speed from the turn-back position to a predetermined position, and that the image sensor is caused to move so as to achieve the first speed from the predetermined position to the home position.

When configured in this manner, the movement time can be shortened compared to when the movement speed from the turn-back position to the home position is always set to a low speed.

In this image reading method, it is preferable that the movement mechanism for causing the image sensor to move includes a direct current motor for causing the image sensor to move and the direct current motor is arranged such that an output shaft of the direct current motor is aligned with a placement surface of the document.

When configured in this manner, it is possible to make the image reading apparatus thinner because a lengthwise direction of the direct current motor is arranged aligned with the document placement surface.

In this image reading method, it is preferable that, in the movement mechanism, a worm gear is attached to the output shaft of the direct current motor so as to align with the placement surface of the document.

When configured in this manner, it is possible to make the image reading apparatus thinner because the driving force of the direct current motor in the movement mechanism can be outputted through a worm gear arranged such that the output shaft is aligned with the placement surface of the document.

An image reading apparatus, including:
  an image sensor for reading an image of a document;
  a movement mechanism for causing the image sensor to move; and
  a controller for controlling the movement mechanism such that the image sensor is caused to move from a side at which the document is placed toward a home position of the image sensor, a movement direction is caused to reverse at a turn-back position after the image sensor has passed the home position, and the image sensor is caused to move again to the home position.

In this manner, backlash produced on the forward drive side of the movement mechanism is reduced at the turn-back position by having the image sensor return to the home position from the turn-back position. For this reason, the image sensor can be made to stand by at the home position in a state where there is no backlash in the movement mechanism.

A storage medium having a program stored thereon, including:
a code for causing to move an image sensor for reading an image of a document from a side at which the document is placed toward a home position of the image sensor;
a code for causing to reverse a movement direction at a turn-back position after the image sensor has passed the home position; and
a code for causing to move the image sensor to the home position again.

In this manner, backlash produced on the forward drive side of the movement mechanism is reduced at the turn-back position by having the image sensor return to the home position from the turn-back position. For this reason, the image sensor can be made to stand by at the home position in a state where there is no backlash in the movement mechanism.

Hereinafter, embodiments are described with reference to the drawings.

First Embodiment

FIG. 1 is a perspective view showing an external view of a scanner device 1 as an image reading apparatus according to a first embodiment. In addition to a scanner function, the scanner device 1 is configured as a so-called multifunction machine provided with a copying function and a printer function, and moreover is connected to a personal computer (hereinafter simply referred to as a "computer") PC.

The scanner device 1 is provided with a scanner structure section 3, which is provided with a transparent platen 2 as a document placement surface for placing a document, and a document cover 4 that covers a document P placed on the platen 2. The scanner structure section 3 is provided with various internal mechanisms that are discussed later such as a carriage 5. Furthermore, the scanner device 1 configured as a multifunction machine is provided with a paper supply device 1a for supplying printing paper as a printing medium and a printing section (not shown in the drawing) that carries out printing on the printing paper. Printing paper that has been printed on is discharged from a discharge outlet 1b. Operation buttons 1c are provided on the scanner device 1 and selecting functions or instructing operations of the scanner device 1 are carried out using these operation buttons 1c.

Figure 2:
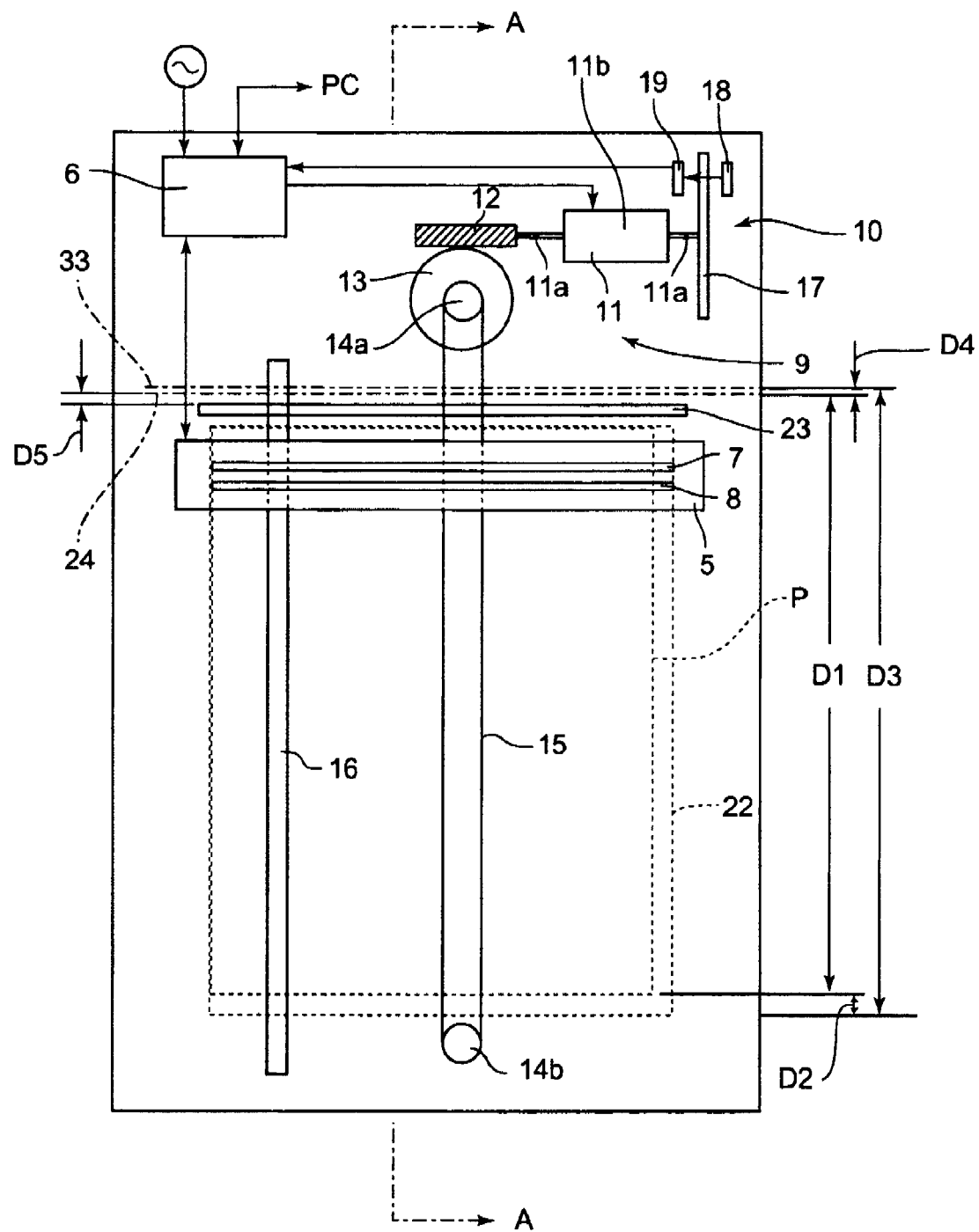
FIG. 2 is a diagram showing an outline of an internal structure of the scanner device shown in FIG. 1.

FIG. 2 is a diagram showing an outline of a mechanism corresponding to the scanner structure section 3 in the scanner device 1 of the present embodiment.

As shown in FIG. 2, the scanner device 1 is provided with components such as a control circuit 6, a carriage 5 that is provided with an image sensor 7 and an LED array 8, a carriage moving mechanism 9 as a means for moving the carriage 5, and an encoder 10. It should be noted that the control circuit 6 also serves as a control section for the printer function and the copying function in addition to controlling the scanner structure section 3.

The carriage moving mechanism 9 is provided with components such as a direct current motor (hereinafter referred to as a "DC motor") 11 as a drive source, a worm gear 12 coupled to an output shaft 11a of the DC motor 11, a spur gear 13 that engages with the worm gear 12 and rotates at a predetermined reduction ratio, a pulley 14a coupled to the spur gear 13, a pulley 14b arranged in opposition to the pulley 14a sandwiching the platen 2 therebetween, a timing belt 15 that spans between the pulley 14a and the pulley 14b, and a guide rail 16 arranged along a spanning direction of the timing belt 15.

When the DC motor 11 is driven, the timing belt 15 rotates via the worm gear 12, the spur gear 13, and the pulley 14a. A portion of the timing belt 15 is secured to the carriage 5 at a securing section 15a (see FIG. 3). Furthermore, the carriage 5 is slidably coupled to the guide rail 16. For this reason, due to rotation of the timing belt 15, the carriage 5 moves along the guide rail 16 along with the securing section 15a.

It should be noted that a direction in which the carriage 5 moves, in other words, a direction in which the timing belt 15 spans is referred to as a sub-scanning direction. Furthermore, in the following description, a direction from the pulley 14a toward the pulley 14b is given as forward (a front side) and an opposite direction thereof is given as backward (a back side). Furthermore, description is given with a side on which the document P is placed on the platen 2 given as an upper side (above) and an opposite side thereof given as a lower side (below).

A casing 11b of the DC motor 11 assumes a cylinder elongated in the direction of the output shaft 11a. And the DC motor 11 is arranged such that the output shaft 11a is parallel to a surface for placing a document on the platen 2. That is, a lengthwise direction of the DC motor 11 is arranged along the platen 2. For this reason, a thickness, that is, a vertical direction size, of the scanner structure section 3 can be reduced. Furthermore, in addition to the lengthwise direction of the DC motor 11 being arranged along the platen 2, the output shaft 11a of the DC motor 11 and the spur gear 13 are connected by the worm gear 12. For this reason, the thickness, that is, the vertical direction size, of the scanner structure section 3 can be reduced further. By making the thickness of the scanner structure section 3 thinner (smaller), the thickness of the scanner device 1 can be made thinner.

The encoder 10 is a rotary encoder and is provided with a disk 17 coupled to the output shaft 11a of the DC motor 11 as well as a light-emitting diode 18 and a photodiode 19 that are arranged sandwiching the disk 17 therebetween. The disk 17 is provided with slits, which are not shown in the drawings and that are cut having a predetermined spacing along a circumference thereof, and the photodiode 19 can receive light that is emitted from the light-emitting diode 18, through these slits (omitted from drawings). Thus, when the disk 17 rotates along with the rotation of the DC motor 11, the photodiode 19 receives the light emitted by the light-emitting diode 18 at the slit portions and does not receive light at portions other than these slits. As a result, the photodiode 19 generates pulses (hereinafter referred to as "encoder pulses") the number of which corresponds to the number of rotations of the DC motor 11, and the encoder 10 outputs these to the control circuit 6. Consequently, a rotation amount and a rotation speed of the DC motor 11 can be detected by counting the encoder pulses.

It should be noted that although omitted from the drawings, there are two pairs of the above-described light-emitting diode 18 and the photodiode 19. And each pair of the light-emitting diode 18 and the photodiode 19 is arranged so that the encoder pulses outputted from the respective photodiodes 19 have a phase shifted from each other by $\pi/2$. This is to enable detection of a rotation direction of the DC motor 11 and also to improve the accuracy of measuring the rotation amounts.

As mentioned above, the carriage 5 is provided with the image sensor 7 and the LED array 8. The image sensor 7 is configured such that a plurality of light-receiving elements (CCDs (charge coupled devices)), which are omitted from the drawings, are arranged in a row at a predetermined pixel density in a main scanning direction, which is a direction orthogonal to the sub-scanning direction that is the movement direction of the carriage 5. The image sensor 7 is configured as a so-called one-dimensional image sensor. The light-receiving elements (omitted from drawings) are provided with an unshown lens with which an image of the document surface is formed at the light-receiving surface of the light-receiving elements.

Furthermore, the LED array 8 is configured such that LED arrays of respective color lights of red, green, and blue are arranged in the sub-scanning direction. That is, a red color light LED array, in which red color light LEDs are arranged in the main scanning direction, a green color light LED array, in which green color light LEDs are arranged in the main scanning direction, and a blue color light LED array, in which blue color light LEDs are arranged in the main scanning direction, are arranged lined up in the sub-scanning direction.

The image sensor 7 receives light that is reflected from an document surface after being irradiated onto the document surface of a document P from the LED array 8, and accumulates electric charges corresponding to an image on the document surface then outputs these as electrical signals to the computer PC.

As shown in FIG. 1, the platen 2 is constituted by a transparent glass plate 20. The glass plate 20 is fitted into an opening 22 that opens as a rectangular shape on an upper surface of a casing 21 of the scanner structure section 3. The document P is placed on the platen 2 (glass plate 20) in a state in which the document surface is facing the platen 2 (glass plate 20). Accordingly, the light irradiated from the LED array 8 passes through the glass plate 20 to shine on the document surface, and the reflected light again passes through the glass plate 20 and becomes incident on the image sensor 7.

Figure 3:
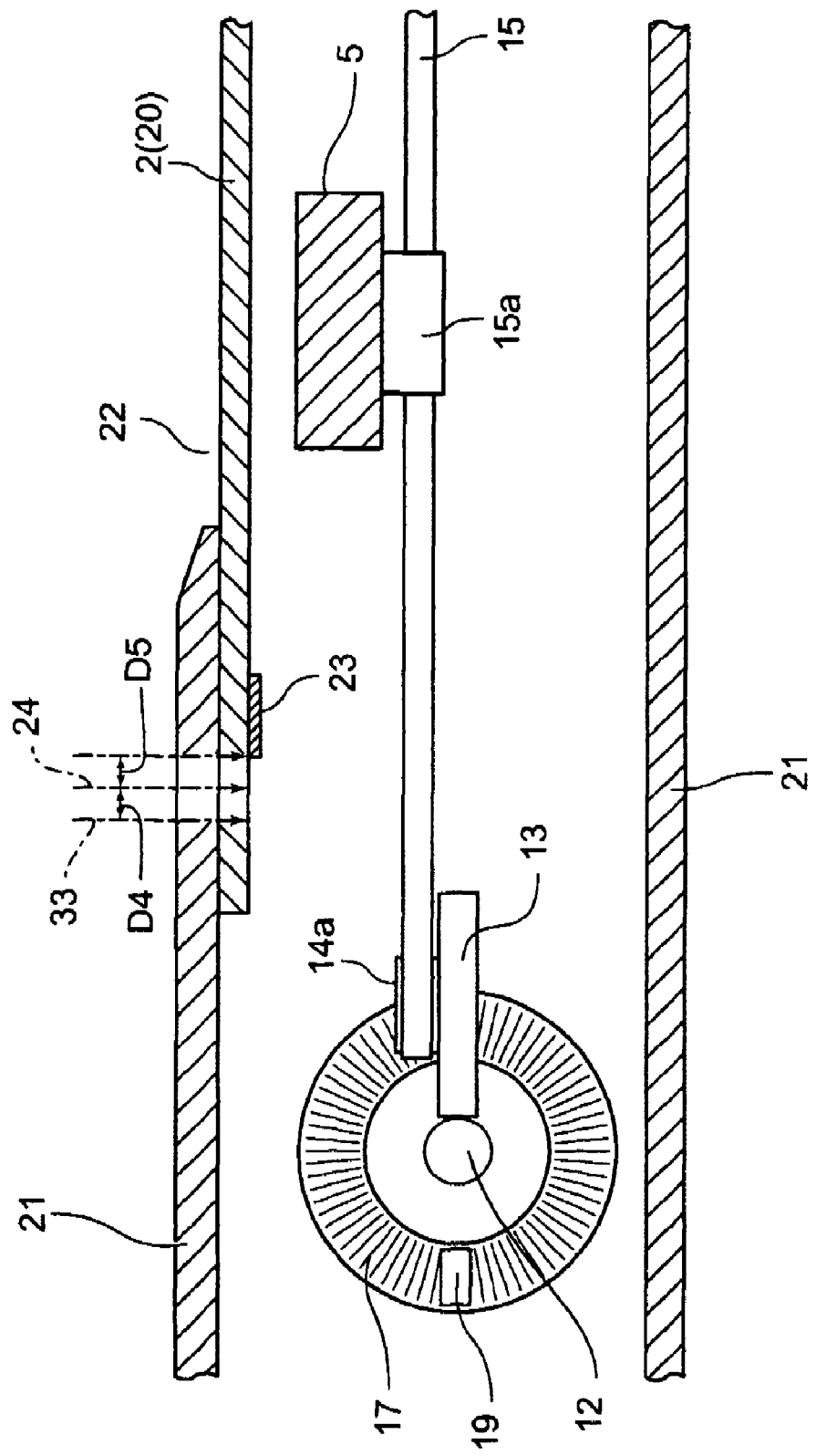
FIG. 3 is a cross-sectional view taken along cutting line A-A in FIG. 2 in which a vicinity of a white reference board is enlarged.

As shown in FIG. 2, a white reference board 23 is arranged between an edge portion of the opening 22 on the pulley 14*a* side and the pulley 14*a*. FIG. 3 shows a cross-sectional view taken along cutting line A-A in FIG. 2 in which a vicinity of the white reference board 23 is enlarged. The white reference board 23 is attached at an inner side surface of the upper surface of the casing 21 and has a white surface facing downward. Before commencing reading of the document surface of the document P, the image sensor 7 carries out shading correction by scanning the white reference board 23.

A home position 24 of the carriage 5 is set behind the white reference board 23. The home position 24 is an initial position at which, before commencing the scanning of the document surface, the carriage 5 makes a leading edge of the image sensor 7 align with and standby at the home position 24.

Figure 4:
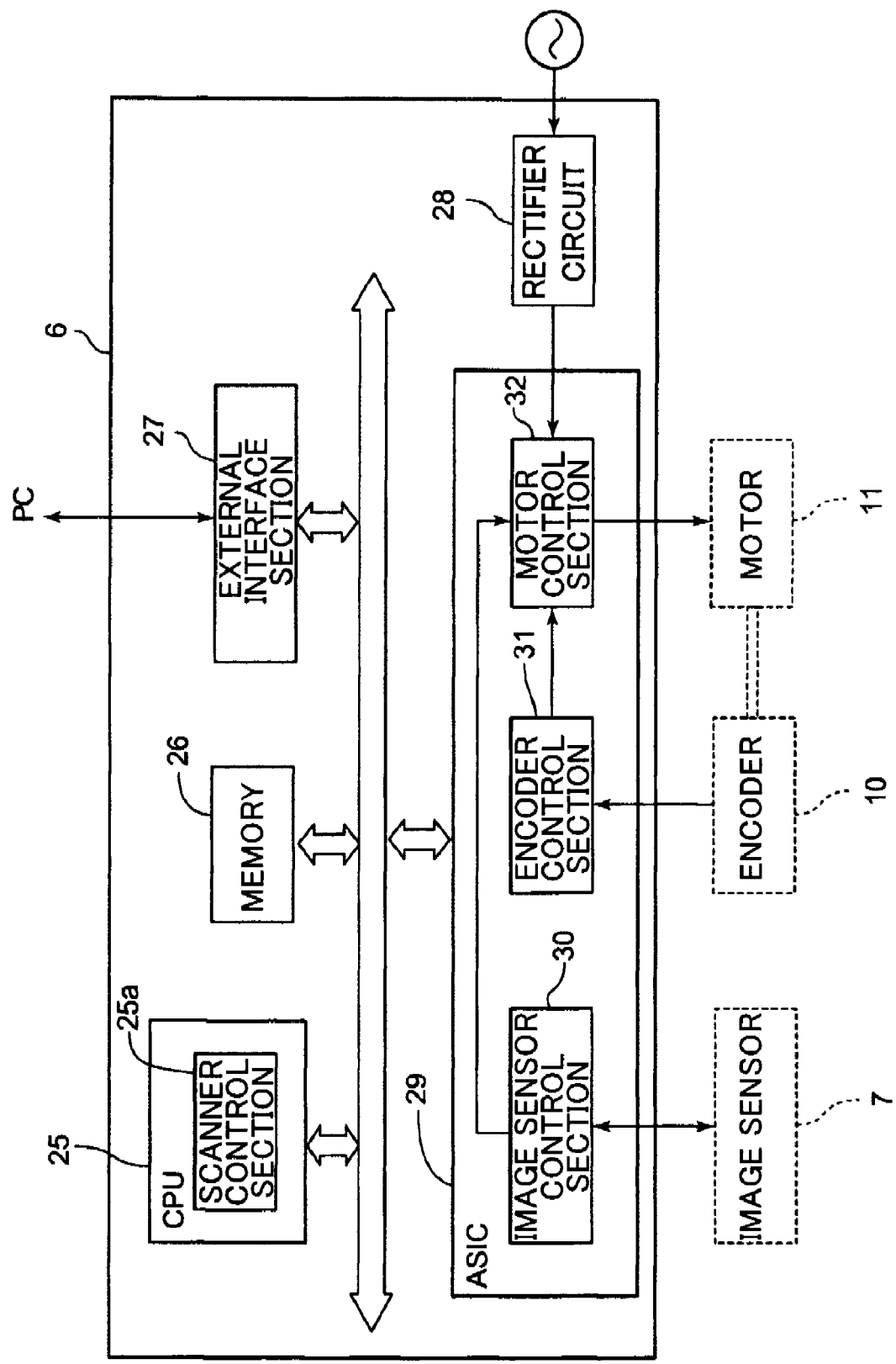
FIG. 4 is a diagram showing an outline of a control circuit shown in FIG. 2.

FIG. 4 is a diagram showing an outline configuration of the control circuit 6 in the present embodiment. As shown in FIG. 4, the control circuit 6 is provided with a CPU 25, a memory 26, an external interface section 27 having a USB interface for connecting the scanner device 1 to the computer PC, a rectifier circuit 28 that converts supplied alternating current to direct current, and an ASIC 29.

The memory 26 stores a program for providing overall control of the scanner device 1, and the CPU 25 functions as a scanner control section 25*a* by executing the program.

The ASIC 29 is provided with an image sensor control section 30, an encoder control section 31, and a motor control section 32.

The image sensor control section 30 has functions for outputting signals (hereinafter referred to as "image sensor drive pulses") that direct the image sensor 7 to read the document, and for inputting signals of the reading results from the image sensor 7 for conversion to tone values (image data).

The encoder control section 31 receives the encoder pulses that are outputted from the encoder 10 and detects the rotation amount, rotation direction, and rotation speed of the DC motor 11.

The motor control section 32 supplies the direct current outputted from the rectifier circuit 28 to the DC motor 11 and controls the rotation speed of the DC motor 11 by controlling the drive current applied to the DC motor 11. It should be noted in regard to the motor control section 32 that the above-mentioned encoder pulses and image sensor drive pulses are inputted from the encoder control section 31 and the image sensor control section respectively.

The motor control section 32 is provided with a register that is omitted from the drawings. And stored in advance in this register are various values of duty ratio increase rates, the number of finishing pulses, and dead band duty ratios corresponding to the resolution in the sub-scanning direction. It should be noted that these values are described below.

The motor control section 32 is further provided with a power control transistor, which is omitted from the drawings, and controls the drive current by so-called PWM ("pulse width modulation) control by changing the proportion (duty ratio) of ON time relative to the switching period of the transistor. In other words, by reducing the duty ratio, the ON time is shortened and the drive current is reduced, and by increasing the duty ratio, the ON time is lengthened and the drive current is increased.

Next, description is given concerning operations of the carriage 5 that moves in a reciprocating manner in the sub-scanning direction under the above-described configuration.

At the commencement of image reading, the carriage 5 stands by in a state in which the leading edge of the image sensor 7 is aligned with the home position 24. When an image reading operation (for example, an operation in which a start switch provided in the scanner device 1 is turned on) is carried out in the scanner device 1, an instruction is outputted from the scanner control section 25*a* of the control circuit 6 to the motor control section 32 and the DC motor 11 commences driving. Due to this, the carriage 5 moves forward by a distance D1 corresponding to a size of the document P and a predetermined stopping distance D2 after having moved by the distance D1, then stops.

The rotation amount of the DC motor 11 and the movement distance of the carriage 5 corresponding to the rotation amount are associated in advance and stored in the memory 26. Furthermore, the distance D1 that is a distance by which the carriage 5 is to be moved corresponding to the size of the document P, and the stopping distance D2 are also stored in the memory 26. Accordingly, when a document size corresponding to the document P is selected using an document size selection button that is omitted from the drawings, the movement distance of the carriage 5 is determined by detecting the rotation amount of the DC motor 11 using the encoder 10 and the carriage 5 moves forward by the distance D1 and the stopping distance D2.

While the carriage 5 is moving forward from the home position 24, the LED array 8 repeats time-division irradiation of R, G, and B color lights. The image sensor 7 receives reflected light of each color light reflected by the document surface conforming to the irradiation timing of each color light, then outputs as electrical signals the charges accumulated in response to the image on the document surface.

Based on the rotation amount of the DC motor 11 detected by the encoder control section 31, the motor control section 32 moves the carriage 5 forward from the home position 24 by the distance D1 and the stopping distance D2. Image reading is carried out while the carriage 5 is moving for the distance D1. Then, while moving for the stopping distance D2, the carriage 5 decelerates then stops. After causing the carriage 5 to move for the distance D1 and also to move for the stopping distance D2 then stop, the motor control section 32 changes the rotation direction of the DC motor 11 and causes the carriage 5 to move backward toward the home position 24.

The carriage 5 moves until a leading edge portion of the image sensor 7 matches a turn-back position 33 that is set backward from the home position 24, then its movement direction is changed forward at this turn-back position 33 and it returns to the home position 24. That is, the leading edge portion of the image sensor 7 is made to match the home position 24. At the home position 24, the carriage 5 stands by ready for the next image reading operation. It should be noted that a distance D3 by which the carriage 5 returns to the turn-back position 33 from a position to which it has moved by the stopping distance D2 upon completion of image reading and a distance D4 by which the carriage 5 turns back from the turn-back position 33 to the home position 24 are stored in advance in the memory 26. Based on the movement distance of the carriage 5 obtained from the rotation amount of the DC motor 11 detected by the encoder 10, the motor control section 32 moves the carriage 5 by the distance D3 and the distance D4, which are stored in the memory 26.

Each time an image reading operation is carried out in the scanner device 1, the carriage 5 moves forward from the home position 24 by the distance D1 corresponding to the size of the document P and the stopping distance D2 while carrying out image reading of the document surface. After moving by the distance D1 and the stopping distance D2, the movement direction is reversed and the carriage 5 moves backward by the distance D3 and is brought back to the turn-back position 33, which is set backward from the home position 24. Then, at the turn-back position 33, an operation is carried out in which the movement direction is reversed and the carriage 5 moves forward by the distance D4 then stops at the home position 24.

Description is given concerning a reason for not returning the carriage 5 directly to the home position 24 after completion of image reading but rather causing the carriage 5 to move temporarily to the turn-back position 33 set backward from the home position 24 and then returning to the home position 24 after that.

In changing the movement direction of the carriage 5, the rotation direction of the DC motor 11 is changed, which causes reverse rotation of the worm gear 12 and the spur gear 13 or the like. On the other hand, in the carriage moving mechanism 9, backlash is present among components such as the spur gear 13 that engages the worm gear 12, the pulley 14a and the pulley 14b as well as the timing belt 15 that spans around these. Accordingly, the carriage 5 commences movement in the reverse direction after the DC motor 11 commences reverse rotation and backlash in the carriage moving mechanism 9 has been eliminated.

In this regard, while rotating by an amount corresponding to backlash, the DC motor 11, the worm gear 12 and the like rotate at high speed. That is, looking at the worm gear 12 and the spur gear 13 for example, the worm gear 12, which is on the side transmitting the driving force of the DC motor 11, does not receive load from the spur gear 13 until backlash is eliminated between the worm gear 12 and the spur gear 13, which is on the side that receives the driving force. For this reason, compared to the rotation speed after backlash has been eliminated, the worm gear 12 rotates at high speed. Furthermore, rotation of the spur gear 13 is stopped until the backlash between the spur gear 13 and the worm gear 12 is eliminated. For this reason, at the time the backlash has been eliminated, the worm gear 12 commences meshing in a manner of colliding into the spur gear 13. Then, the spur gear 13 moves undesirably at a high speed during a moment until the impact of the collision is absorbed.

In regard also to the pulley 14a, the pulley 14b and the timing belt 15 that spans around these, immediately after the backlash between the pulley 14a, the pulley 14b and the timing belt 15 is eliminated, the timing belt 15, which receives driving force from the pulley 14a, rotates for a moment at high speed. Accordingly, the carriage 5 undesirably moves at high speed immediately after backlash in the carriage moving mechanism 9, which is constituted by components such as the worm gear 12 and the spur gear 13, has been eliminated.

The distance between the home position and the white reference board in the scanner device is generally set to be approximately ⅒ mm, and a width of the white reference board in the movement direction of the image sensor is approximately 1 mm. Accordingly, in causing the image sensor to commence moving from the home position for image reading, there is a problem that, when the image sensor moves undesirably at high speed due to the impact of backlash, the image sensor will pass the white reference board without sufficiently carrying out shading correction.

In the scanner device 1 according to the present embodiment, in terms of downsizing the scanner device 1, a distance D5 between the home position 24 and a rear side end of the white reference board 23 is set to 0.074 mm. Furthermore, a front-to-rear direction width of the white reference board 23 is set to 1.201 mm. In other words, this is configured such that data collection for shading correction is carried out while movement from the home position 24 is performed over an extremely short distance.

Accordingly, upon finishing image reading of the document surface and stopping as it is at the home position 24, the carriage 5 stands by while backlash is still present in the carriage moving mechanism 9. Then, when an image reading operation is carried out in this state, the carriage 5 undesirably moves for a moment at high speed at the initial commencement of movement due to an influence of backlash.

As mentioned earlier, shading correction is configured such that data collection commences immediately after the commencement of movement of the carriage 5 from the home position 24, and that the data is collected over an extremely short distance. For this reason, when the carriage 5 undesirably moves at high speed immediately after backlash in the carriage moving mechanism 9 is eliminated, there is a risk that accurate data for shading correction cannot be obtained.

Accordingly, rather than causing the carriage 5 to stop directly at the home position 24 when it returns to the home position 24 side upon the completion of image reading, this is set so that the carriage 5 moves to the turn-back position 33, which is set backward from the home position 24, then the movement direction is changed to forward at the turn-back position 33, and the carriage 5 is made to move to the home position 24 and stop there.

By configuring in this manner, the DC motor 11 is rotated in reverse at the turn-back position 33, and backlash in the carriage moving mechanism 9 is eliminated when the carriage 5 commences to move forward. That is, in the carriage moving mechanism 9 in which the movement direction is reversed at the turn-back position 33 and movement is performed from the turn-back position 33 to the home position 24 before stopping, backlash is eliminated with respect to a direction for causing the carriage 5 to move forward. For this reason, when an image reading operation is performed by the scanner device 1 in a state in which the carriage 5 is standing by at the home position 24, the white reference board 23 is passed by at a predetermined speed due to the predetermined DC motor 11 and therefore data for shading correction can be obtained correctly and accurately.

As described earlier, in the present embodiment, the distance D4 between the turn-back position 33 and the home position 24 is set to 0.926 mm. This distance D4 is set to a distance by which backlash can be reliably eliminated by causing the carriage 5 to move slightly after backlash in the carriage moving mechanism 9 is eliminated and the carriage 5 can be caused to stop at the home position 24 by accurately controlling the stopping position of the carriage 5. It should be noted that the distance D4 is set as appropriate in consideration of such factors as the movement speed of the carriage 5, and inertia at the time of moving the carriage 5 and driving the carriage moving mechanism 9.

In this regard, in the present embodiment, until the carriage 5 returns to the home position 24 after the carriage 5 reads an image by its forward movement from the home position 24 and reading has finished, the control circuit 6 carries out movement control of the carriage 5 in a following manner.

First, the carriage 5 is accelerated forward from the home position 24 using open loop control until the carriage 5 approaches a predetermined speed, that is, until the DC motor 11 approaches a predetermined rotation speed. Then, a transition is made to PID (proportional-integral-derivative) control when approaching the predetermined speed, and the carriage 5 is accelerated to the predetermined speed using PID control and is moved forward at the predetermined speed. Then, when movement has been performed by the distance D1 at which image reading finishes, a switch is made from PID control to open loop control and deceleration is carried out to a predetermined speed. Then, a switch is made again to PID control, and the carriage 5 is stopped in a position at which movement has been performed for the stopping distance D2.

Next, the movement direction is reversed and the carriage 5 moves toward the turn-back position 33. For this movement also, acceleration is carried out using open loop control in the same manner as the above-described movement control in which movement is performed forward from the home position 24 until approaching a predetermined speed. Then, when approaching the predetermined speed, a transition is made to PID (proportional-integral-derivative) control, and the carriage 5 is accelerated to the predetermined speed using PID control and is moved backward at the predetermined speed. Then, when approaching the turn-back position 33, a switch is made to open loop control and deceleration is carried out to a predetermined speed. Then, a switch is made again to PID control, and the carriage 5 is stopped at the turn-back position 33.

As mentioned earlier, the turn-back position 33 and the home position 24 have an extremely narrow gap therebetween. For this reason, it is necessary to apply an extremely small drive current to the motor, thereby causing the DC motor 11 to rotate at an extremely slow rotation speed to cause the carriage 5 to move. On the other hand, the DC motor 11 has an electric current range (dead band) in which the DC motor 11 cannot rotate since the torque obtained in response to the drive current is smaller than static friction. Consequently, when applying an extremely small drive current to the DC motor 11 in order to cause the DC motor 11 to rotate, there is a risk that the drive current will undesirably fall within this dead band range and the DC motor 11 will not rotate.

Figure 5:
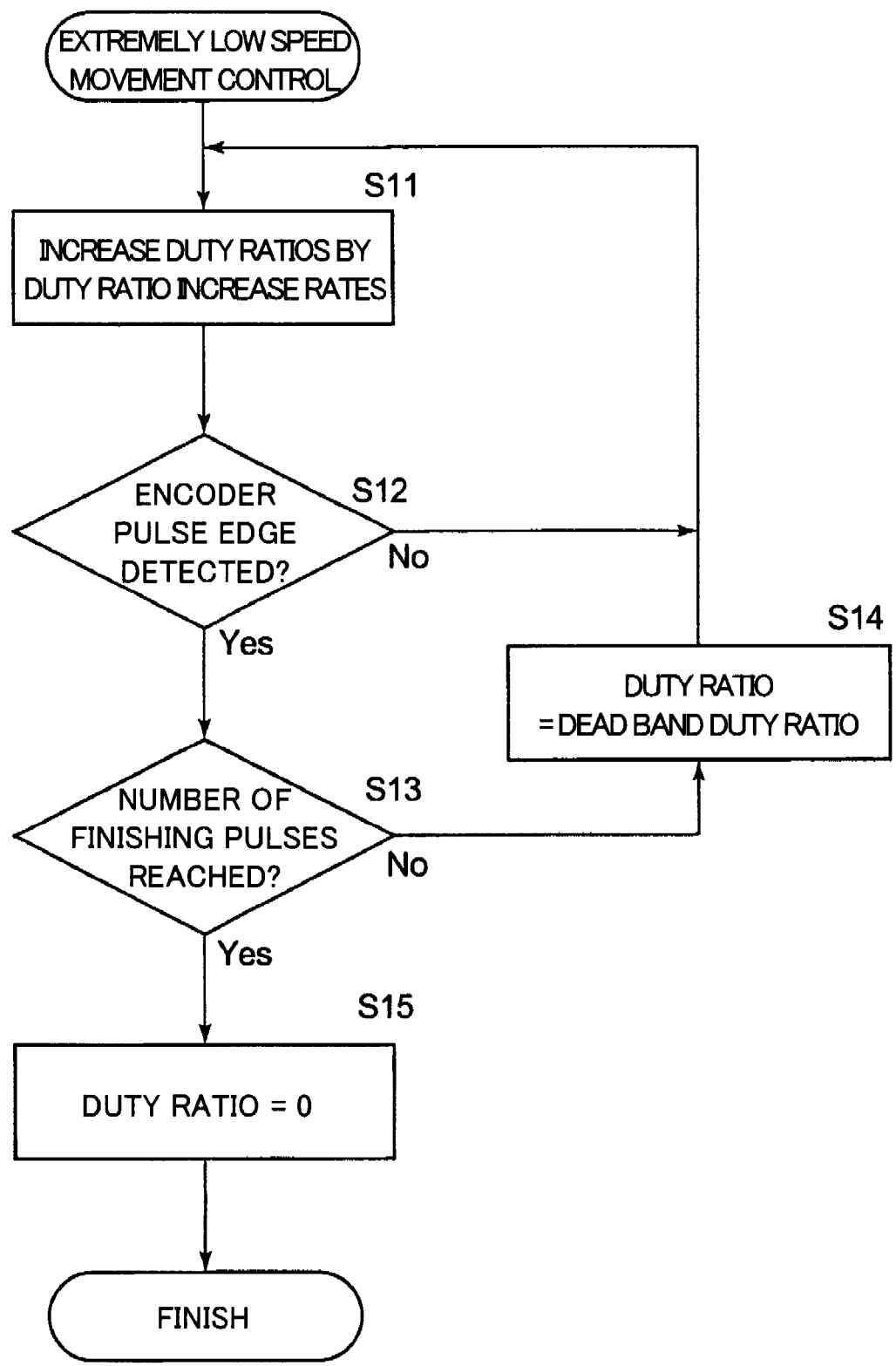
FIG. 5 is a flowchart showing a procedure of extremely low speed movement control according to the first embodiment.
Figure 6:
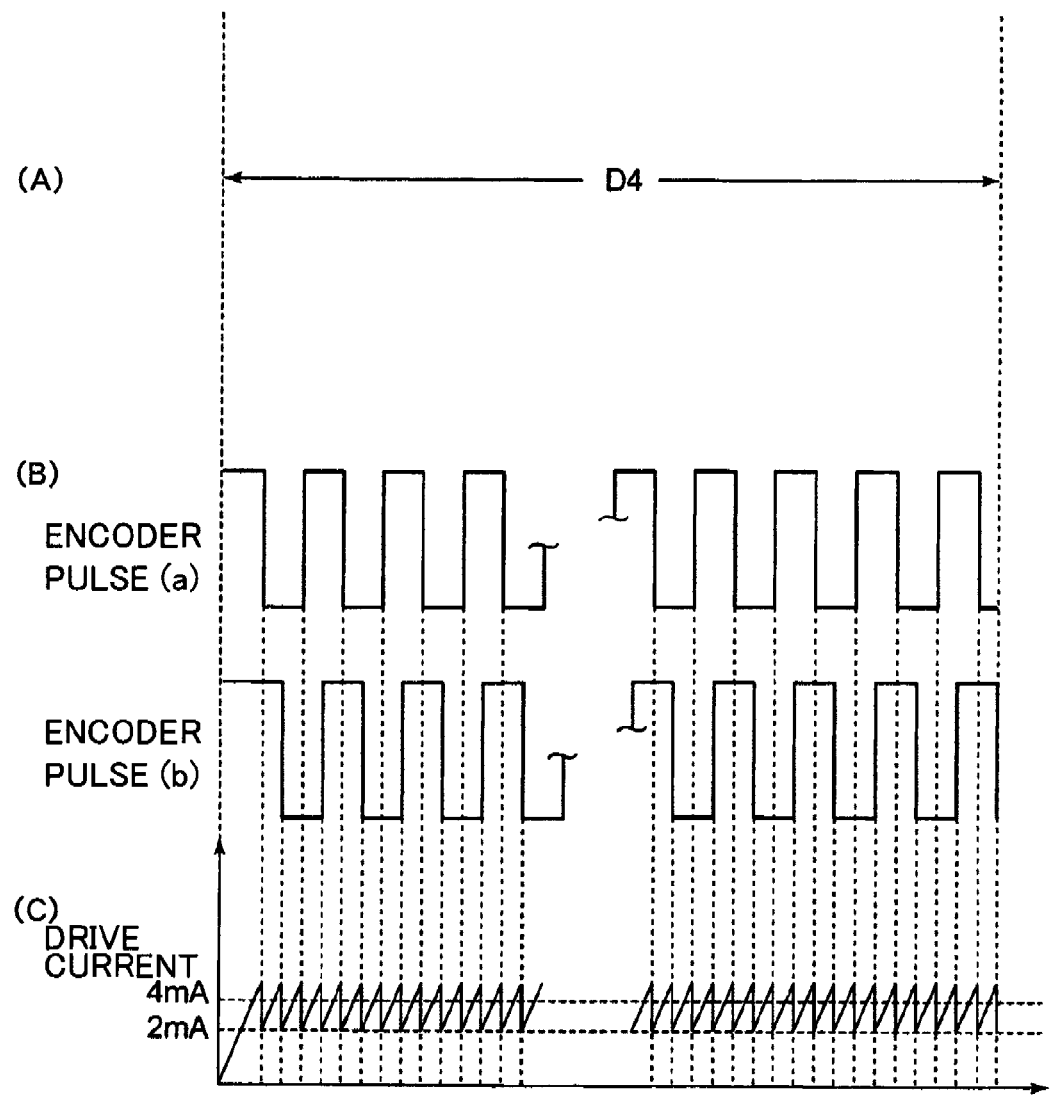
FIG. 6 is a timing chart showing a relationship between movement of a carriage, encoder pulses, and drive current under extremely low speed movement control according to the first embodiment.

Accordingly, as is described using FIGS. 5 and 6, the carriage 5 is moved during from the turn-back position 33 to the home position 24 by performing rotation control of the DC motor 11 using extremely low speed rotation control.

FIG. 5 is a flowchart showing a procedure of extremely low speed movement control according to the present embodiment. And, FIG. 6 is a timing chart showing a mutual relationship among the distance D4 between the turn-back position 33 and the home position 24, the encoder pulses, and the drive current, under the extremely low speed movement control of the present embodiment.

In FIG. 6, an upper level (A) shows the distance D4 between the turn-back position 33 and the home position 24, a middle level (B) shows encoder pulses that are inputted to the motor control section 32, and a lower level (C) shows drive currents that the motor control section 32 applies to the DC motor 11, respectively. It should be noted that the encoder pulses in the middle level (B) are shown as two encoder pulses (a) and (b), which are shifted by $\pi/2$ with respect to each other.

When the extremely low speed movement control shown in FIG. 5 commences, the motor control section 32 reads out duty ratio increase rates from the register (omitted from drawings). These duty ratio increase rates indicate degrees of increases in the duty ratios corresponding to the passing of time, and while keeping time with an unshown timer, the motor control section 32 gradually increases the duty ratios by these duty ratio increase rates (step S11).

Then, the motor control section 32 determines whether or not an encoder pulse edge has been detected (step S12) and increases the duty ratio until it is determined that the edge has been detected.

When the duty ratios are gradually increased by the duty ratio increase rates in this manner, the drive current gradually increases as shown at the left edge of drive current (C) in FIG. 6. Then, when the drive current emerges from the range of the dead band (here, for example, 4 mA), the DC motor 11, which had been paused, commences to rotate. As a result, if the encoder pulses (a) are at high level at the point in time at which extremely low speed movement control commenced, then the encoder pulses (a) change from high level to low level.

Then, when the encoder pulses (a) change from high level to low level, the motor control section 32 determines that an edge has been detected, and in this case, it reads out the number of finishing pulses from the register (omitted from drawings) and further determines whether or not the respective numbers of pulses of the encoder pulses (a) and (b) that are detected after commencement of extremely low speed movement control, have reached the number of finishing pulses (step S13).

Here, for example, "300" is stored in the register (omitted from drawings) as the number of finishing pulses corresponding to the distance D4 between the turn-back position 33 and the home position 24. Then, in a case where the detected edge is the first edge after extremely low speed movement control has been commenced, the motor control section 32 determines that the number of detected pulses has not reached the number of finishing pulses, which is "300."

Then, in this case, the motor control section 32 reads out the dead band duty ratios from the register and reduces the duty ratios to these dead band duty ratios (step S14), then again executes the processes of step S11 to step S14.

The dead band duty ratios are duty ratios that correspond to drive currents within the dead band range. Then, duty ratios corresponding to a drive current of 2 mA are stored in the register (omitted from drawings) as the dead band duty ratios corresponding to the distance D4 (0.926 mm) between the turn-back position 33 and the home position 24.

Then, when the duty ratio at the second time process of step S11 is increased, the drive current is gradually increased from 2 mA. When it emerges from the dead band and becomes 4 mA or more, the DC motor 11 again commences to rotate. Then, due to the disk 17 rotating, this time the encoder pulses (b) change from high level to low level as shown in FIG. 6.

Accordingly, the motor control section 32 detects an edge of the encoder pulses (b). Then, since no new encoder pulses (a) or (b) are detected after commencement of extremely low speed movement control at the point in time that the edge is detected, the motor control section 32 again carries out the process of step S14 and the duty ratios are reduced to the dead band duty ratios.

When the processes of step S11 to step S14 are repetitively executed in this manner, the DC motor 11 repetitively rotates and pauses and the motor control section 32 begins to detect new encoder pulses (a) and (b). Then, when it is determined in the process of step S13 that the number of detected pulses has reached the number of finishing pulses, the motor control section 32 sets the duty ratio to 0 (step S15) and causes rotation of the DC motor 11 to stop completely.

As described above, the motor control section 32 repetitively carries out a process in which it gradually increases the duty ratios at the duty ratio increase rates and a process in which it reduces the duty ratios to the dead band duty ratios if an encoder pulse edge has been detected and the number of finishing pulses has not been reached. As a result, the drive current is repetitively changed from within the dead band range to outside of the dead band range, then returning to within the dead band range again, and therefore the DC motor 11 repetitively rotates and pauses in the vicinity of the dead band.

Thus, in causing the carriage 5 to move from the turn-back position 33 to the home position 24, the DC motor 11 can be caused to rotate at an extremely slow rotation speed. As a result, the carriage 5 can be moved so that the leading edge portion of the image sensor 7 accurately aligns with the home position 24, which is set at an extremely short distance from the turn-back position 33.

Furthermore, according to the present embodiment, an image reading apparatus can be provided that can commence movement of the image sensor from the home position in a state in which there is no impact due to backlash.

Second Embodiment

Next, a second embodiment is described with reference to FIGS. 7 and 8. In the extremely low speed movement control according to the above-described first embodiment, the interval between encoder pulses was uniform as shown in the middle level (B) of FIG. 6. That is, the application timing and the magnitude of the applied electric current of the drive current applied from the turn-back position 33 to the home position 24 was uniform.

In contrast to this, in the second embodiment, as is described below, the distance D4 that the carriage 5 moves from the turn-back position 33 to the home position 24 is divided into an initial movement region D6 (see FIG. 7), which is a first predetermined distance, and a final movement region D7 (see FIG. 7), which is a final predetermined distance, and in the extremely low speed movement control, the application timing of the applied electric current and the magnitude of the applied electric current are set into two levels corresponding to the initial movement region D6 and the final movement region D7.

That is, while the carriage 5 commences movement from the turn-back position 33 and moves over the initial movement region D6, the application timing of the applied electric current and the applied electric current are set so that the carriage 5 moves at a fast speed. Then, in the final movement region D7 during moving to the home position 24 after passing the predetermined distance of the initial movement region D6, the application timing of the applied electric current and the magnitude of the applied electric current are set so that the carriage 5 moves at a slow speed.

It should be noted that the overall configuration of the scanner device 1, the detailed configuration of the control circuit 6, and the characteristics of the DC motor 11 are equivalent to those described for the foregoing embodiment, and therefore description thereof is omitted. However, the register (omitted from drawings) provided in the motor control section 32 stores in advance various values for initial duty ratios and the number of initial pulses, in addition to duty ratio increase rates, the number of finishing pulses, and dead band duty ratios. It should be noted that these values are described below.

Figure 7:
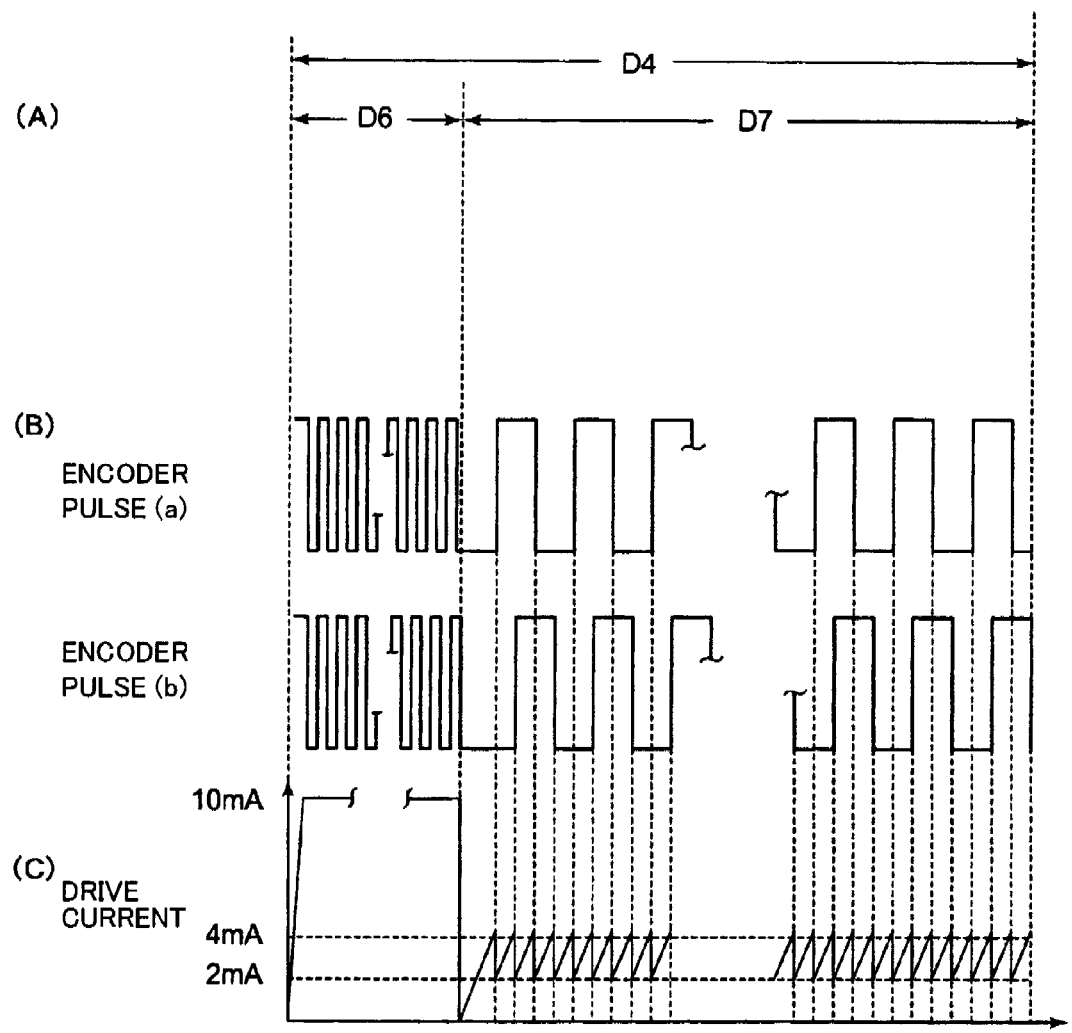
FIG. 7 is a timing chart showing a relationship between movement of a carriage, encoder pulses, and drive current under extremely low speed movement control according to a second embodiment.

First, an overview of extremely low speed movement control according to the second embodiment is described using FIG. 7.

FIG. 7 is a timing chart showing a mutual relationship among the distance D4 between the turn-back position 33 and the home position 24, the encoder pulses, and the drive current, under the extremely low speed movement control according to the second embodiment.

The upper level (A) shows a distance D4 between the turn-back position 33 and the home position 24, a distance D6 corresponding to the initial movement region D6 in which the carriage 5 moves at a fast speed after commencing movement, and a distance D7 corresponding to the final movement region D7 in which, after passing the initial movement region D6, the carriage 5 moves at a slow speed to the home position 24. It should be noted that, in the figure, the distance D6 is shown as being shorter than the distance D7, but the actual distances are set such that the distance D6 is several times the length of the distance D7. A middle level (B) shows encoder pulses that are inputted to the motor control section 32, and a lower level (C) shows drive currents that the motor control section 32 applies to the DC motor 11. It should be noted that the encoder pulses in the middle level (B) are shown as two encoder pulses (a) and (b), which are shifted by π/2 with respect to each other.

When extremely low speed movement control commences, as shown in the lower level (C) of FIG. 7, the motor control section 32 first applies to the DC motor 11 a drive current sufficiently larger than the dead band range (for example, 10 mA (amps)) to cause the DC motor 11 to rotate. Then, after causing the DC motor 11 to rotate by an amount proportional to 290 encoder pulses as the number of initial pulses, the motor control section 32 sets the drive current to 0 A (amps) to cause a temporary pause in the rotation of the DC motor 11. After this, in a manner equivalent to the extremely low speed rotation movement control described in the foregoing first embodiment, the motor control section 32 repetitively carries out a process in which it increases the drive current gradually and a process in which it sets the drive current to within the range of the dead band (2 mA) at the point in time when an edge of either the encoder pulses (a) or the encoder pulses (b) has been detected, and the motor control section 32 causes the DC motor 11 to rotate by an amount proportional to 10 encoder pulses as the number of finishing pulses.

In this manner, the DC motor 11 is caused to rotate by an amount proportional to 300 encoder pulses (290 pulses+10 pulses) and the carriage 5 is moved from the turn-back position 33 to the home position 24. As described in the foregoing first embodiment, "300" is stored in the register (omitted from drawings) as the number of pulses corresponding to the distance between the turn-back position 33 and the home position 24, namely, the distance D4.

The rotation amount of the DC motor 11 for the 290 initial pulses does not accurately correspond to the movement distance of the carriage 5. This is because the initial rotation of the DC motor 11 involves an idle rotation period for eliminating backlash wherein the carriage 5 does not move. On the other hand, the distance D7 corresponding to the rotation amount of the DC motor 11 for the 10 finishing pulses corresponds to the movement distance of the carriage 5. It should be noted that, in FIG. 7, the scale of the distances D6 and D7 is drawn different from the actual scale in order make the shapes of the encoder pulses readily understandable.

Figure 8:
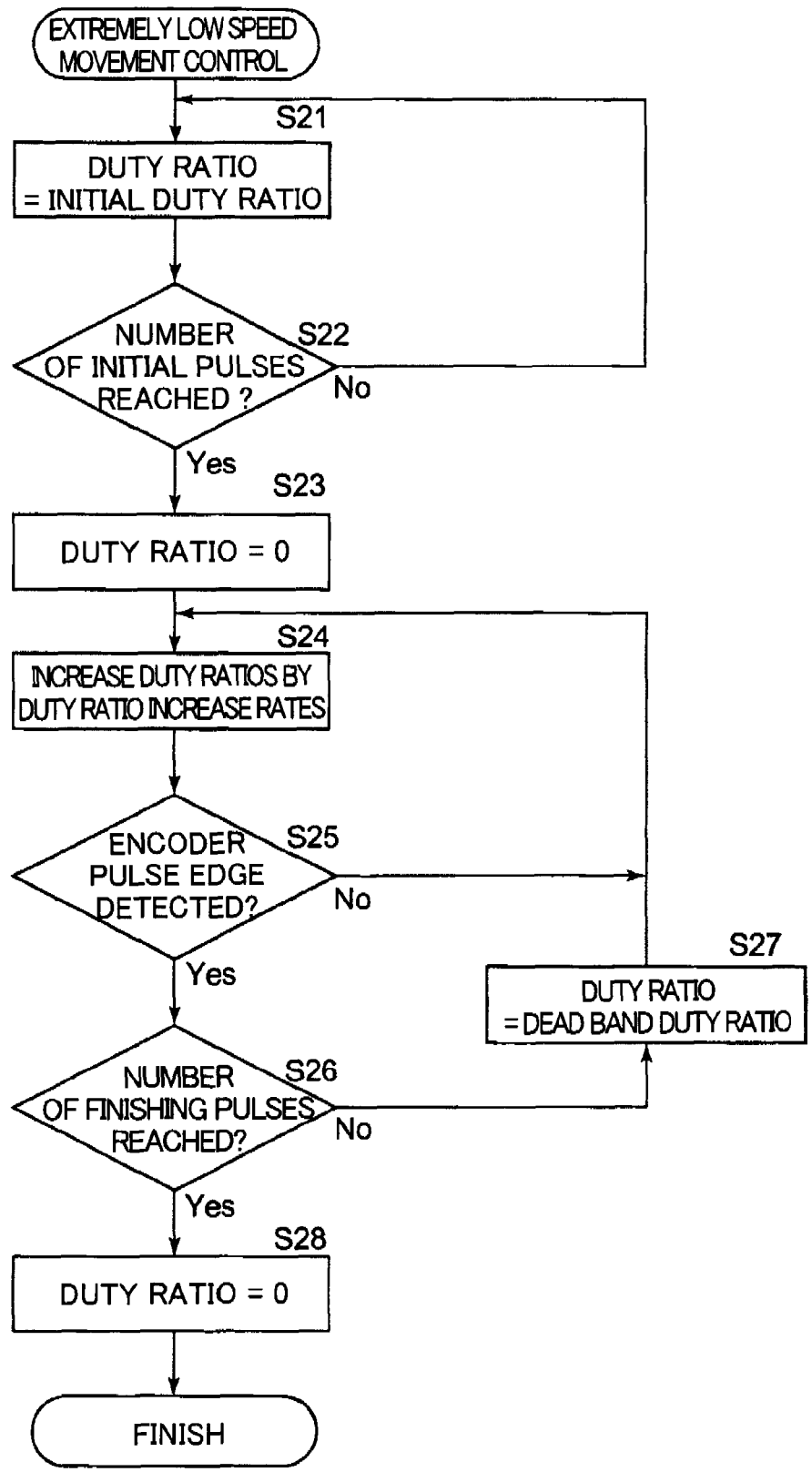
FIG. 8 is a flowchart showing a procedure of extremely low speed movement control according to the second embodiment.

FIG. 8 is a flowchart showing a procedure of extremely low speed movement control according to the second embodiment. When the extremely low speed movement control shown in FIG. 8 commences, the motor control section 32 reads out from the register (omitted from drawings) provided in the motor control section 32 initial duty ratios that have been set to be sufficiently larger than the dead band range but also to correspond to a drive current smaller than the current during ordinary driving, then the motor control section 32 controls the drive currents with these initial duty ratios (step S21).

Here, duty ratios corresponding to a drive current of 10 mA are stored in the register (omitted from drawings) as the initial duty ratios. In this case, the drive current becomes 10 mA. A drive current of 10 mA is a drive current sufficiently larger than the dead band range, and therefore the DC motor 11 starts up promptly and rotates at a fast rotation speed.

When the drive current becomes 10 mA and the DC motor 11 commences to rotate, the motor control section 32 inputs encoder pulses from the encoder control section 31 as shown in FIG. 7. Then, the motor control section 32 reads out the number of initial pulses from the register (omitted from drawings) and determines whether or not the number of the inputted encoder pulses has reached the number of initial pulses (step S22). Then, when the motor control section 32 determines that the number of the inputted encoder pulses has reached the number of initial pulses (=290 pulses), the motor control section 32 sets the duty ratio to 0 and causes rotation of the DC motor 11 to temporarily pause (step S23).

Here, for example, "290" is stored in the register (omitted from drawings) as the number of initial pulses by which the carriage 5 is to move from the turn-back position 33 to the home position 24. In this case, as shown in FIG. 7, after the motor control section 32 has received the 290 encoder pulses, the drive current becomes 0 A.

Following this, the processes of step S24 to step S28 are substantially equivalent to the processes of step S11 to step S15 respectively for the extremely low speed movement control according to the above-described first embodiment, and therefore description is simplified below.

The motor control section 32 reads out the duty ratio increase rates from the register (omitted from drawings) then, while keeping time with an unshown timer, gradually increases the duty ratios by the duty ratio increase rates (step S24).

Then, the motor control section 32 determines whether or not an encoder pulse edge has been detected (step S25) and increases the duty ratio until it is determined that the edge has been detected.

As a result, as shown in FIG. 7, if the encoder pulses (a) are at low level at the point in time at which the DC motor 11 is temporarily paused by the process of step S23, then the encoder pulses (a) change from low level to high level due to the disk 17 commencing rotation.

Then, when the encoder pulses (a) change from low level to high level, the motor control section 32 determines that an edge has been detected, and in this case, it reads out the number of finishing pulses from the register (omitted from drawings) and further determines whether or not the respective numbers of pulses of the encode pulses (a) and (b) have reached the number of finishing pulses (step S26).

In the present embodiment, "10" is assumed to be stored in the register (omitted from drawings) as the number of finishing pulses. Then, in a case where the detected edge is the first edge after detection of the 290 pulses, which is the number of initial pulses, that is, the 291st pulse, the motor control section 32 determines that the number of the detected pulses has not reached the number of finishing pulses, which is "10".

Then, in this case, the motor control section 32 reads out the dead band duty ratios from the register (omitted from drawings) and reduces the duty ratios to these dead band duty ratios (step S27), then again executes the processes of step S24 to step S27. It should be noted that the duty ratios corresponding to a drive current of 2 mA are stored in the register in the same manner as the first embodiment as the dead band duty ratios corresponding to the final movement region D7.

When the processes of step S24 to step S27 are repetitively executed in this manner, the DC motor 11 rotates by an amount proportional to 10 encoder pulses while repetitively rotating and pausing and the motor control section 32 determines in the process of step S26 that the number of finishing pulses has been reached. In this case, the motor control section 32 sets the duty ratio to 0 (step S28) and causes rotation of the DC motor 11 to stop.

As a result of the above-described extremely low speed movement control, the movement of the carriage 5 from the turn-back position 33 to the home position 24 is divided as shown in FIG. 7 to the initial movement region D6 (a region in which the carriage 5 moves by the execution of processes of the step S21 to step S23) and the final movement region D7 (a region in which the carriage 5 moves by the repetitive execution of processes of the step S24 to step S27) so that the time in which the carriage 5 moves from the turn-back position 33 to the home position 24 is shortened and the leading edge portion of the image sensor 7 can be accurately stopped at the home position 24.

That is, in the initial movement region D6, the motor control section 32 causes the DC motor 11 to rotate at a fast speed. Accordingly, backlash is eliminated promptly and the carriage 5 moves at a fast speed. On the other hand, in the final movement region D7 in which the carriage 5 approaches the home position 24, the motor control section 32 causes the DC motor 11 to rotate at a low speed such that the carriage 5 can be stopped accurately at the home position 24.

Accordingly, compared to the DC motor 11 being repetitively rotated and paused in the vicinity of the dead band throughout the time in which the carriage 5 moves from the turn-back position 33 to the home position 24 as described in the first embodiment, the time in which the carriage 5 moves from the turn-back position 33 to the home position 24 is shortened, and in the final movement region D7, the DC motor 11 is repetitively rotated and paused in the vicinity of the dead band, and therefore the DC motor 11 can be rotated at an extremely slow speed and the carriage 5 can be moved accurately to the home position 24.

Third Embodiment

Figure 9:
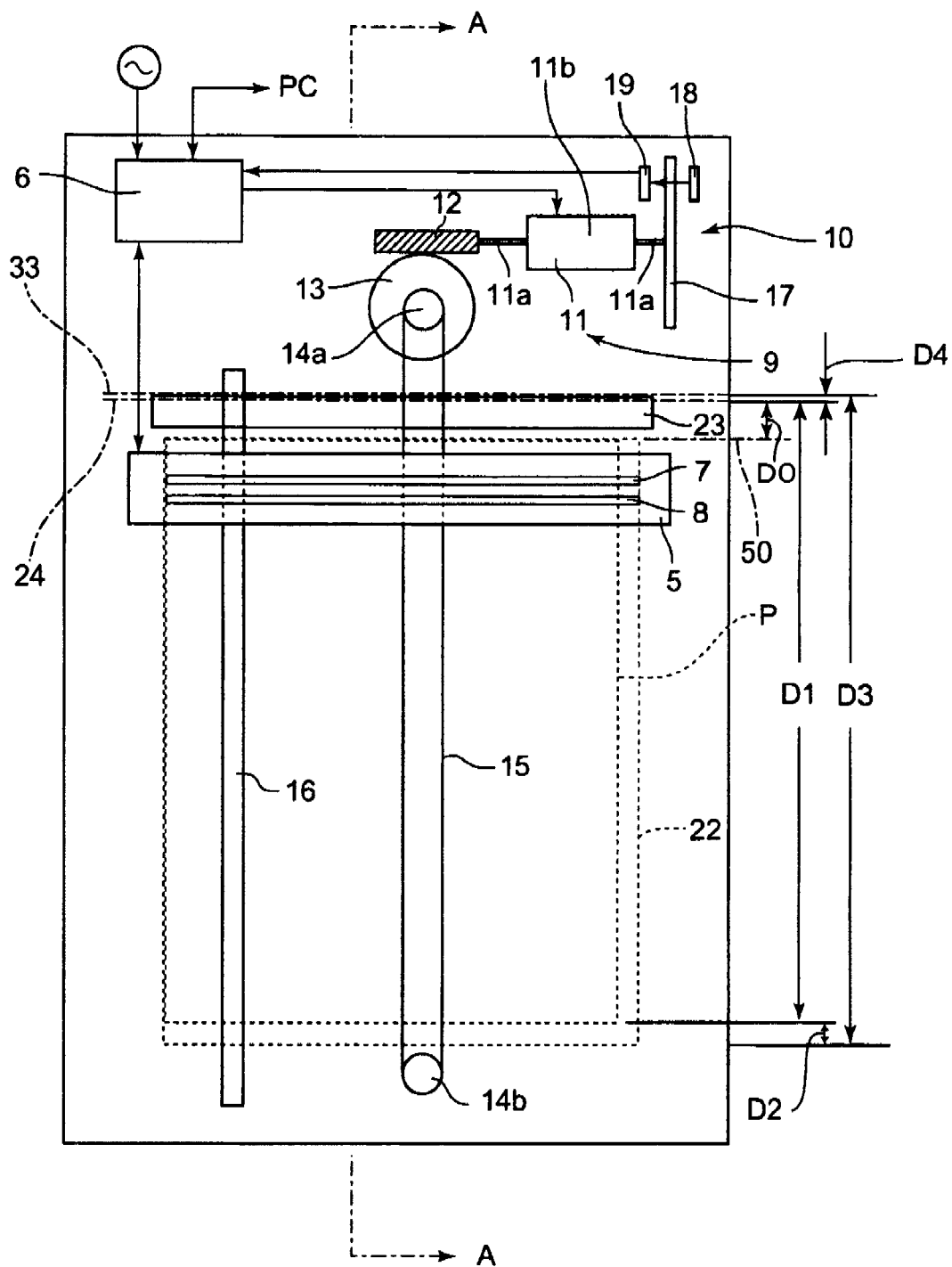
FIG. 9 is a diagram for describing various movement ranges of the image sensor 7 according to a third embodiment.

FIG. 9 is a diagram for describing various movement ranges of the image sensor 7 according to a third embodiment. The position of the home position 24 of the image sensor 7 according to the third embodiment is a position different from the home position 24 according to the first embodiment. In the third embodiment, the home position 24 of the image sensor 7 is a position that opposes the white reference board 23.

Furthermore, a reading commencement position 50 of a target image is shown in the figure. The target image reading commencement position 50 is a position at which the image sensor 7 pauses temporarily immediately before reading the document P. Also shown is an interval D0 from the home position 24 to the target image reading commencement position 50.

In this regard, in the scanner device 1, shading correction of the image sensor 7 is carried out immediately before image reading. Shading correction is carried out for each single time of image reading. Shading correction is carried out by reading the white reference board 23 as described earlier.

In the shading correction, black shading correction and white shading correction are carried out as is described later. Black shading correction is carried out while the image sensor 7 is being paused. On the other hand, white shading correction is carried out while reading the white reference board 23 by moving the image sensor 7.

However, when there is fluctuation in the movement speed of the image sensor 7 at this time, data for performing white shading correction cannot be obtained appropriately. A cause of fluctuation being produced in the movement speed is that the carriage 5 moves undesirably at high speed immediately after backlash produced in the carriage moving mechanism 9 is eliminated as described in the first embodiment. In the third embodiment, the home position 24 of the image sensor 7 is a position that opposes the white reference board 23. And when an image reading operation is carried out, shading correction is carried out promptly. Thus, it is desirable that the home position 24 of the image sensor 7 is a position in which backlash has been already removed and moreover in which the image sensor 7 can be caused to move without receiving an influence of when the backlash was eliminated.

Here, "the image sensor 7 can be caused to move without receiving an influence of when the backlash was eliminated" refers to the following, for example. When attempting to eliminate backlash, one gear is brought into contact with another gear. At the point in time when the one gear has been brought into contact with the other gear, backlash is provisionally eliminated. However, due to the force of coming into contact with the other gear, the one gear receives a reverse direction counteraction. Although receiving the counteraction, the one gear is being rotated by the DC motor 11, and therefore both gears again come into contact. In this manner, mechanical vibrations are produced between the gears by the repetition of contact and rebounding, but the amplitude of these vibrations gradually decreases such that a smooth transmission of force is achieved between the gears. When a smooth transmission of force can be carried out between the gears in this manner, the image sensor 7 can be caused to move without receiving an influence of when the backlash is eliminated. It should be noted that at this time, speed fluctuation is also minimized substantially and movement of the image sensor 7 can be commenced.

Here, the position of the home position 24 is set to a position in which the backlash produced in the carriage moving mechanism 9 is eliminated and moreover in which the image sensor 7 can be caused to move without receiving an influence of when backlash is eliminated.

Figure 10:
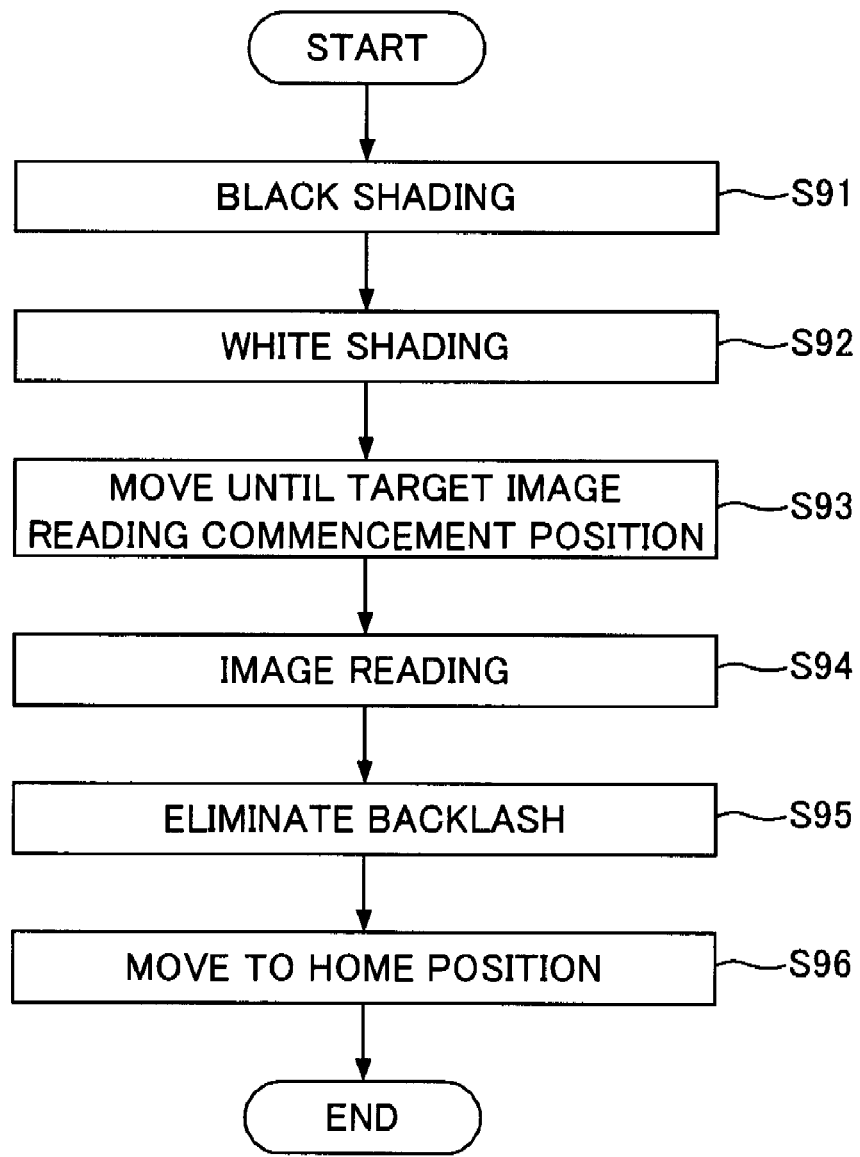
FIG. 10 is a flowchart for describing an image reading operation of the image sensor 7.

FIG. 10 is a flowchart for describing an image reading operation of the image sensor 7. The flowchart shows a process in which the image sensor 7 at the home position 24 reads the document P and again returns to the home position.

Initially, the image sensor 7 is stopped at the home position 24. When an image reading operation is carried out in the scanner device 1, initially the scanner device 1 commences shading correction of the image sensor 24. As mentioned earlier, in the shading correction, there is black shading correction and white shading correction. Here, first, black shading correction is carried out (S91).

Black shading correction refers to correction for making uniform, for each of the light-receiving elements of the image sensor 7 lined up in the main scanning direction, the amount of individual charges accumulated by the light-receiving elements when "black" has been read. In other words, due to this correction, the sensitivity to black can be made uniform for all the light-receiving elements.

When black shading correction is to be carried out, the image sensor 7 is caused to stop at the home position 24. That is, black shading correction for the image sensor 7 is carried out while causing the image sensor 7 to pause at the home position 24. At this time, the LED array 8 is turned off.

Next, the scanner device 1 carries out white shading correction (S92). White shading correction refers to correction for making uniform, for each of the light-receiving elements of the image sensor 7 lined up in the main scanning direction, the amount of individual charges accumulated by the light-receiving elements when "white" has been read. In other words, due to this correction, the sensitivity to white can be made uniform for all the light-receiving elements.

The white reference board 23 used in the third embodiment has a width of approximately 1 cm with respect to the sub-scanning direction. The image sensor 7 reads the white reference board 23 while moving at low speed below the white reference board 23, and the sensitivity of each of the light-receiving elements is corrected based on this. Here, reading of the white reference board 23 while moving is carried out in consideration of a case where dust or the like is stuck to a portion of the white reference board 23. When dust or the like has become stuck to the white reference board 23, "white" cannot be read in that location. For this reason, in order to compensate for a case where dust has become stuck, reading of the white reference board 23 is performed while moving and the amounts of accumulated charge are averaged. Further still, this white shading correction is carried out by virtually dividing the white reference board 23 into seven regions with respect to the sub-scanning direction. And by averaging the amounts of charges that could be obtained in each region, more accurate shading correction can be carried out.

When white shading correction is completed in the above-described manner, movement of the image sensor 7 is caused to pause temporarily. Next, the image sensor 7 moves to the target image reading commencement position 50 (S93). The movement to the target image reading commencement position 50 (movement in the interval D0) is moved at a higher speed than the speed at the time of image reading, or at least at a higher speed than the movement speed during the above-mentioned extremely low speed movement control. This is because accurate precision in the movement speed is not required since image reading is not necessary during this movement. And by moving at high speed in the interval D0 under this circumstance, the time required for the overall operation of image reading can be shortened. It should be noted that at this time, the LED array 8 is turned off.

When the image sensor 7 is caused to move to the target image reading commencement position 50, image reading of the document P commences (S94). During image reading, the image sensor 7 is moved at a predetermined speed that is subjected to speed control using PID control. Furthermore, at this time, the LED array 8 is turned on.

When image reading finishes, the image sensor 7 is caused to move toward the home position 24. Here also, the image sensor 7 passes over the home position 24 once in the same manner as the above-described first embodiment. Then the image sensor 7 is caused to move to the turn-back position 33 and is temporarily paused.

Next, the image sensor 7 is caused to move from the turn-back position 33 to the home position 24, and at this time backlash is produced between the worm gear 12 and the spur gear 13. Accordingly, at this time, the image sensor 7 is moved to the home position 24 where the backlash is eliminated and moreover the image sensor can move without receiving an influence of the backlash being eliminated (S95).

In moving from the turn-back position 33 to the home position 24, the rotation direction of the DC motor 11 is reversed. While the motor 11, the worm gear 12, and the disk 17 are rotated in a reverse direction at the turn-back position, there is a period in which the spur gear 13 cannot be caused to rotate due to backlash. After this, the worm gear 12 and the spur gear 13 are brought into contact, and as described earlier, backlash is provisionally eliminated and the spur gear 13 commences to rotate. However, mechanical vibrations are produced by repetitive contact and counteraction between the worm gear 12 and the spur gear 13 as described earlier. After this, these vibrations are gradually reduced as movement of the image sensor 7 progresses over the distance D4, and a smooth transmission of force can be carried out between the gears. Then, at the home position 24, the image sensor 7 can be caused to move without receiving an influence of when the backlash was eliminated.

For movement over the distance D4 from the turn-back position 33 to the home position 24, the image sensor 7 is caused to move using extremely low speed movement control, which is described using FIG. 6 in the first embodiment. Description has already been given in regard to movement over the distance D4 and therefore further description is omitted. It should be noted that, after image reading is finished, the LED array 8 is turned off until the image sensor 7 has moved to the home position 24.

It should be noted that in regard to movement over the distance D4 that the image sensor 7 may be caused to move by using speed control in the initial movement region D6 and speed control in the final movement region D7 as described using FIG. 7 in the second embodiment. Description has already been given in regard to movement in the initial movement region D6 and the final movement region D7, and therefore further description is omitted. It should be noted that the speed of the image sensor 7 in the initial movement region D6 corresponds to a second speed and the speed of the image sensor 7 in the final movement region D7 corresponds to a first speed.

Then, when the image sensor 7 is caused to move to the home position 24 (S95), the image sensor 7 is caused to stop at the position of the home position 24.

By doing this, the backlash produced in the carriage moving mechanism 9 is removed for when the image sensor 7 is caused to stop at the home position 24. And, moreover, at the home position 24, movement of the image sensor 7 can be caused to commence without receiving an influence of when the backlash was eliminated. By doing this, the image sensor 7 is moved with minimal speed fluctuation immediately after initial movement and the white reference board 23 can be read appropriately immediately after commencement of movement.

Embodiments are not limited to the foregoing first, second, and third embodiments. For example, in the second embodiment, of the "300" encoder pulses of when the carriage 5 moves from the turn-back position 33 to the home position 24, "290" pulses are allotted to the initial movement region D6 and "10" pulses are allotted to the final movement region D7, but there is no limitation to this; "250" pulses may be allotted to the initial movement region D6 while "50" pulses are allotted to the final movement region D7.

Furthermore, in the second embodiment, the application timing of the applied electric current and the magnitude of the applied electric current are set in two levels of the initial movement region D6 and the final movement region D7, with the carriage 5 being moved at a fast speed initially then at a slow speed for approaching the home position 24, which is a stopping position. In contrast to this, movement may be commenced at a slow speed when the carriage 5 commences movement from the turn-back position 33. Thereafter, movement may be performed at a fast speed, and then a stop may be made by again using a slow speed for approaching the home position 24, which is a stopping position. By doing this, a smooth commencement of movement can be carried out for the carriage 5.

Furthermore, in the foregoing embodiments, the carriage 5 is moved using extremely low speed movement control from the turn-back position 33 to the home position 24, but movement control using so-called feedback control, which is inclusive of PID control, may also be used.

Furthermore, in the foregoing embodiments, the duty ratios are based on the drive current, but these may be based on voltage.

Furthermore, in the foregoing embodiments, the DC motor 11 is used as the drive source, but an AC (alternating current) motor such as a synchronous motor may also be used.

Furthermore, in the foregoing embodiments, an optical rotary encoder is employed for such factors as the rotation amount of the DC motor 11, but an encoder of a different system may also be used.

Furthermore, in the foregoing embodiments, the image sensor 7 used CCDs as the light-receiving elements, but a CMOS (Complementary Metal Oxide Semiconductor) may also be used as the light-receiving elements.

Furthermore, as an example of other embodiments, a case is conceivable where, under a condition in which the home position 24 is positioned between the white reference board 23 and the turn-back position 33, the position of the home position 24 is not a position at which the image sensor 7 can be caused to move without receiving an influence of when backlash is eliminated. At this time, the position of the white reference board 23 may be set to a position at which the image sensor 7 can be caused to move without receiving an influence of when backlash is eliminated. By doing this, even assuming a scanner device 1 in which the image sensor 7 cannot be caused to move at the home position 24 without receiving an influence of when backlash is eliminated, appropriate reading of the white reference board 23 can be achieved by ensuring that the image sensor 7 can be caused to move without receiving an influence of when backlash is eliminated until completion of movement to the position of the white reference board 23.

The foregoing techniques can be applied for example to scanners, copier machines, and multifunction machines or the like that include a scanner or printer or the like.

What is claimed is:

1. A document reading method, comprising:

causing a sensor for reading a document to move from a side at which the document is placed toward a home position of the sensor;

causing to reverse a movement direction at a turn-back position after the image sensor has passed the home position; and causing the image sensor to move to the home position again, wherein a position of a reference section for adjusting a reading sensitivity of the image sensor is set to a position at which, after backlash produced in a movement mechanism due to the movement direction being reversed is reduced, the image sensor can be caused to move without receiving an influence of when the movement mechanism reduced the backlash.

2. The document reading method according to claim 1, wherein the home position is a position at which the image sensor opposes the reference section.

3. The document reading method according to claim 1, wherein a movement of the image sensor from the turn-back position to the home position is performed at a slower speed than a speed of when the image sensor is caused to move to a position for reading the document after reading a reference section for adjusting a reading sensitivity of the image sensor.

4. The document reading method according to claim 1, wherein a movement mechanism for causing the sensor to move includes a direct current motor for causing the sensor to move, and the direct current motor is arranged such that an output shaft of the direct current motor is aligned with a placement surface of the document.

5. The document reading method according to claim 4, wherein, in the movement mechanism, a worm gear is attached to the output shaft of the direct current motor so as to align with the placement surface of the document.

6. The document reading method, comprising:

causing a sensor for reading a document to move from a side at which the document is placed toward a home position of the image sensor;

causing to reverse a movement direction at a turn-back position after the image sensor has passed the home position; and causing the image sensor to move to the home position again, wherein the home position is positioned between a reference section for adjusting a reading sensitivity of the image sensor and the turn-back position, and a position of the reference section is set to a position at which, after backlash produced in a movement mechanism due to the movement direction being caused to reverse is reduced, the image sensor can be caused to move without receiving an influence of when the movement mechanism reduced the backlash.

7. The document reading method, comprising:

causing a sensor for reading a document to move from a side at which the document is placed toward a home position of the image sensor;

causing to reverse a movement direction at a turn-back position after the image sensor has passed the home position; and causing the image sensor to move to the home position again, wherein two speeds of a first speed and a second speed faster than the first speed are used for movement of the sensor from the turn-back position to the home position, the first speed being slower than a speed of when the sensor is moved to a position for reading the document after reading a reference section for adjusting a reading sensitivity of the sensor, the sensor is caused to move so as to achieve the second speed from the turn-back position to a predetermined position, and the sensor is caused to move so as to achieve the first speed from the predetermined position to the home position.

8. A document reading apparatus, comprising:

a sensor for reading a document;

a movement mechanism for causing the sensor to move; and a controller for controlling the movement mechanism such that the sensor is caused to move from a side at which the document is placed toward a home position of the sensor, a movement direction is caused to reverse at a turn-back position after the sensor has passed the home position, and the sensor is caused to move again to the home position, wherein a position of a reference section for adjusting a reading sensitivity of the sensor is set to a position at which, after backlash produced in a movement mechanism due to the movement direction being reversed is reduced, the sensor can be caused to move without receiving an influence of when the movement mechanism reduced the backlash.

9. A computer-readable medium having a program stored thereon, comprising: a code for causing to move a sensor for reading a document from a side at which the document is placed toward a home position of the sensor; a code for causing to reverse a movement direction at a turn-back position after the sensor has passed the home position; and a code for causing to move the sensor to the home position again, wherein a position of a reference section for adjusting a reading sensitivity of the sensor is set to a position at which, after backlash produced in a movement mechanism due to the movement direction being reversed is reduced, the sensor can be caused to move without receiving an influence of when the movement mechanism reduced the backlash.

* * * * *